United States Patent
Mori et al.

(10) Patent No.: US 9,133,601 B2
(45) Date of Patent: Sep. 15, 2015

(54) HYDRAULIC EXCAVATOR
(71) Applicant: KOMATSU LTD., Tokyo (JP)
(72) Inventors: Tadashi Mori, Hirakata (JP); Manabu Himoto, Kyotanabe (JP); Osamu Nishimura, Joyo (JP); Kenji Sanada, Hirakata (JP)
(73) Assignee: KOMATSU LTD., Tokyo (JP)
( * ) Notice: Subject to any disclaimer, the term of this patent is extended or adjusted under 35 U.S.C. 154(b) by 0 days.
(21) Appl. No.: 14/114,793
(22) PCT Filed: Nov. 20, 2012
(86) PCT No.: PCT/JP2012/080011
§ 371 (c)(1),
(2) Date: Oct. 30, 2013
(87) PCT Pub. No.: WO2014/061169
PCT Pub. Date: Apr. 24, 2014
(65) Prior Publication Data
US 2014/0102823 A1   Apr. 17, 2014
(30) Foreign Application Priority Data

Oct. 16, 2012   (JP) ................................ 2012-228795

(51) Int. Cl.
*F01N 13/00* (2010.01)
*E02F 9/08* (2006.01)
(Continued)
(52) U.S. Cl.
CPC .............. *E02F 9/0866* (2013.01); *F01N 3/021* (2013.01); *F01N 13/009* (2014.06); *F01N 13/08* (2013.01); *F01N 2590/08* (2013.01); *Y02T 10/20* (2013.01)
(58) Field of Classification Search
CPC ............ E02F 9/00; E02F 9/08; E02F 9/0808; E02F 9/0858; B60K 13/04; F01N 3/033; F01N 3/28; F01N 3/2882; F01N 13/1805; F01N 13/08; F01N 13/009; F01N 13/00; F01N 13/023; F01N 13/035; F01N 13/0821; F01N 13/0842; F01N 13/2066; F01N 13/206; F01N 13/24; F01N 2340/00; F01N 2340/02; F01N 2340/04; F01N 2610/02

USPC ............ 180/309, 296; 60/297, 301, 322, 311; 123/195 A, 198 R; 55/282, 282.3
See application file for complete search history.

(56) References Cited

U.S. PATENT DOCUMENTS 7,937,936 B2 * 5/2011 Recker et al. ................... 60/297
7,966,979 B2 * 6/2011 Olsen et al. ................ 123/41.31
(Continued)

FOREIGN PATENT DOCUMENTS

EP         2302180 A1 *  3/2011
JP         2012-97413 A    5/2012
(Continued)

OTHER PUBLICATIONS

International Search Report for PCT/JP2012/080011, issued on Mar. 5, 2013.

*Primary Examiner* — Paul N Dickson
*Assistant Examiner* — Steve Clemmons
(74) *Attorney, Agent, or Firm* — Global IP Counselors, LLP

(57) ABSTRACT

A hydraulic excavator includes an engine, a revolving frame supporting the engine, a vehicle body frame, a diesel particulate filter device, and a first connecting pipe. The vehicle body frame is disposed on the revolving frame. The diesel particulate filter device and the selective catalytic reduction device are supported by the vehicle body frame. The first connecting pipe connects the engine and the diesel particulate filter device. The first connecting pipe includes a bellows part that is extendable in at least a portion thereof. The diesel particulate filter device is located further away from the engine than the selective catalytic reduction device. The first connecting pipe passes below the selective catalytic reduction device and is connected to the diesel particulate filter device. A connecting portion for the diesel particulate filter device and the first connecting pipe is located below the diesel particulate filter device.

20 Claims, 4 Drawing Sheets

(51) Int. Cl.
*F01N 13/08* (2010.01)
*F01N 3/021* (2006.01)

(56) References Cited

U.S. PATENT DOCUMENTS

| | | | | |
|---|---|---|---|---|
| 8,141,535 B2 * | 3/2012 | Olsen et al. | ............... | 123/198 E |
| 8,191,668 B2 * | 6/2012 | Keane et al. | ................. | 180/296 |
| 8,327,627 B2 * | 12/2012 | Kowada | ......................... | 60/295 |
| 8,561,395 B2 * | 10/2013 | Golin et al. | ........................ | 60/311 |
| 8,715,578 B2 * | 5/2014 | Fukuda | ......................... | 422/170 |
| 2006/0156712 A1 * | 7/2006 | Buhmann et al. | ............... | 60/297 |
| 2006/0266022 A1 * | 11/2006 | Woerner et al. | ................. | 60/295 |
| 2008/0314033 A1 * | 12/2008 | Aneja et al. | ..................... | 60/297 |
| 2009/0293467 A1 * | 12/2009 | Boeckenhoff | ................. | 60/324 |
| 2010/0018188 A1 * | 1/2010 | Torisaka et al. | ................ | 60/286 |
| 2010/0024407 A1 * | 2/2010 | Merchant et al. | ............... | 60/311 |
| 2010/0031644 A1 * | 2/2010 | Keane et al. | .................... | 60/295 |
| 2010/0083646 A1 * | 4/2010 | Poppe | .............................. | 60/311 |
| 2010/0132333 A1 * | 6/2010 | Endo et al. | ...................... | 60/285 |
| 2010/0178215 A1 * | 7/2010 | Honda et al. | .................. | 422/171 |
| 2010/0178216 A1 * | 7/2010 | Honda et al. | .................. | 422/171 |
| 2010/0186388 A1 * | 7/2010 | Olsen et al. | ..................... | 60/295 |
| 2010/0186393 A1 * | 7/2010 | Kowada | ......................... | 60/295 |
| 2010/0187383 A1 * | 7/2010 | Olsen et al. | .................... | 248/201 |
| 2010/0205945 A1 * | 8/2010 | Kowada | .......................... | 60/297 |
| 2010/0257849 A1 * | 10/2010 | Kowada | .......................... | 60/297 |
| 2010/0269494 A1 * | 10/2010 | Saito et al. | ....................... | 60/311 |
| 2011/0041485 A1 * | 2/2011 | Kimura | ............................ | 60/297 |
| 2011/0074150 A1 * | 3/2011 | Drost et al. | .................... | 285/363 |
| 2011/0088376 A1 * | 4/2011 | Kowada | .......................... | 60/297 |
| 2011/0120085 A1 * | 5/2011 | Saito et al. | ....................... | 60/272 |
| 2011/0167807 A1 * | 7/2011 | Mitsuda | ........................... | 60/311 |
| 2011/0192671 A1 * | 8/2011 | Mitsuda et al. | ............... | 180/309 |
| 2012/0017574 A1 * | 1/2012 | Hasan et al. | .................... | 60/297 |
| 2012/0023914 A1 * | 2/2012 | Omote et al. | ................... | 60/295 |
| 2012/0124983 A1 * | 5/2012 | Hong | ............................... | 60/324 |
| 2012/0222413 A1 * | 9/2012 | Golin et al. | ....................... | 60/311 |
| 2012/0247861 A1 * | 10/2012 | Mizuno et al. | ................ | 180/296 |
| 2012/0255287 A1 * | 10/2012 | Kowada | .......................... | 60/295 |
| 2012/0260635 A1 * | 10/2012 | Aneja et al. | ..................... | 60/274 |
| 2012/0273648 A1 * | 11/2012 | Maske et al. | .................. | 248/636 |

FOREIGN PATENT DOCUMENTS

| | | | |
|---|---|---|---|
| WO | WO 2009041103 A1 * | 4/2009 | |
| WO | WO 2011129030 A1 * | 10/2011 | |
| WO | 2011/152306 A1 | 12/2011 | |

* cited by examiner

HYDRAULIC EXCAVATOR

CROSS-REFERENCE TO RELATED APPLICATIONS

This application is a U.S. National stage application of International Application No. PCT/JP2012/080011, filed on Nov. 20, 2012. This U.S. National stage application claims priority under 35 U.S.C. §119(a) to Japanese Patent Application No. 2012-228795, filed in Japan on Oct. 16, 2012, the entire contents of which are hereby incorporated herein by reference.

BACKGROUND

1. Field of the Invention

The present invention relates to a hydraulic excavator.

2. Background Information

A hydraulic excavator is equipped with an exhaust processing device. An exhaust processing device is connected to an engine through a connection pipe (exhaust pipe) for processing exhaust from the engine. The exhaust processing device includes a diesel particulate filter device and a selective catalytic reduction device. The diesel particulate filter device reduces particulate matter in the exhaust. The selective catalytic reduction device reduces nitrogen oxides (NOx) in the exhaust.

When the exhaust processing device is attached to the engine so as to be supported by the engine, a heavy object is provided on top of the engine. Consequently, a load on a bracket for attaching the exhaust processing device to the engine becomes larger. The weight of the bracket increases when the size of the bracket is increased to strengthen the bracket.

Therefore, the exhaust processing device is preferably attached to a supporting object other than the engine. For example, in Japan Patent Laid-open Patent Publication 2012-097413, a table is provided via supporting legs on an upper frame. The diesel particulate filter device and the selective catalytic reduction device are disposed on an upper surface of the table.

SUMMARY

When the exhaust processing device is supported by a supporting object other than the engine as described in the above Japan Patent Laid-open Patent Publication 2012-097413, there is a possibility that the supporting object may deflect due to the weight of the exhaust processing device. As a result, installation inaccuracies occur when connecting the exhaust processing device and the engine. Consequently, connecting the engine and the exhaust processing device may become difficult.

The diesel particulate filter device requires a high frequency of maintenance compared to the selective catalytic reduction device due to the collection of particulate matter in the exhaust gas. During maintenance, the diesel particulate filter device is removed from the vehicle. At this time, a connecting pipe may interfere with the diesel particulate filter device depending on the position of the connecting pipe. In this case, it becomes difficult to remove the diesel particulate filter device from the vehicle and maintenance performance is reduced.

An object of the present invention is to provide a hydraulic excavator in which difficulties when connecting the engine and the diesel particulate filter device are resolved, and in which maintenance performance for the diesel particulate filter device can be improved.

A hydraulic excavator according to a first embodiment of the present invention comprises an engine, a revolving frame, a vehicle body frame, a diesel particulate filter device, a selective catalytic reduction device, and a connecting pipe. The revolving frame supports the engine. The vehicle body frame is disposed on the revolving frame. The vehicle body frame includes a plurality of column members. The diesel particulate filter device treats exhaust from the engine. The diesel particulate filter device is supported by the vehicle body frame. The selective catalytic reduction device treats exhaust from the engine. The selective catalytic reduction device is supported by the vehicle body frame. A first connecting pipe connects an engine and the diesel particulate filter device. The connecting pipe includes a bellows part that is extendable in at least a portion thereof. The diesel particulate filter device is located further away from the engine than the selective catalytic reduction device. The first connecting pipe passes below the selective catalytic reduction device to be connected to the diesel particulate filter device. A connecting portion for the diesel particulate filter device and the first connecting pipe is located below the diesel particulate filter device.

The hydraulic excavator according to a second embodiment of the present invention is related to the hydraulic excavator of the first embodiment, wherein the connecting portion is located straight below the diesel particulate filter device.

The hydraulic excavator according to a third embodiment of the present invention is related to the hydraulic excavator of the first embodiment, wherein the first connecting pipe includes a bend section. The bend section includes a first opening and a second opening. The first opening is provided at one end of the bend section and is connected to the connecting portion. The second opening is provided at the other end of the bend section and is connected to the bellows part. The second opening faces toward the engine.

The hydraulic excavator according to a fourth embodiment of the present invention is related to the hydraulic excavator of the first embodiment, wherein the diesel particulate filter device has a tubular shape. The connecting portion is located below the center of the circular cross-section of the diesel particulate filter device.

The hydraulic excavator according to a fifth embodiment of the present invention is related to the hydraulic excavator of the first to fourth embodiments, wherein the bellows part is disposed horizontally.

The hydraulic excavator according to a sixth embodiment of the present invention is related to the hydraulic excavator of the first to fourth embodiments, wherein a top portion of the diesel particulate filter device is located higher than a top portion of the selective catalytic reduction device.

The hydraulic excavator according to a seventh embodiment of the present invention is related to the hydraulic excavator of the first to fourth embodiments, wherein a bottom portion of the diesel particulate filter device is located higher than a bottom portion of the selective catalytic reduction device.

The hydraulic excavator according to an eighth embodiment of the present invention is related to the hydraulic excavator of the sixth embodiment, and further includes a second connecting pipe. The second connecting pipe connects the diesel particulate filter device and the selective catalytic reduction device. The second connecting pipe is located above the selective catalytic reduction device.

The hydraulic excavator according to a ninth embodiment of the present invention is related to the hydraulic excavator of the first to fourth embodiments, wherein the first connecting pipe is connected to the diesel particulate filter device via a spherical joint.

The hydraulic excavator according to a tenth embodiment of the present invention is related to the hydraulic excavator of the first to fourth embodiments, and further includes a hydraulic pump. The hydraulic pump is driven by the engine. The bellows part is disposed above the hydraulic pump.

The hydraulic excavator according to an eleventh embodiment of the present invention is related to the hydraulic excavator of the first to fourth embodiments, and further includes an exterior cover. The exterior cover is attached to the vehicle body frame.

The hydraulic excavator according to a twelfth embodiment of the present invention is related to the hydraulic excavator of the first to fourth embodiments, wherein the diesel particulate filter device and the selective catalytic reduction device are disposed in a row in a state in which the respective longitudinal directions thereof are orthogonal to the vehicle width direction. The bellows part extends in the vehicle width direction.

The hydraulic excavator according to a thirteenth embodiment of the present invention is related to the hydraulic excavator of the first to fourth embodiments, wherein the vehicle body frame further includes a beam member. The beam member is supported by column members. The diesel particulate filter device and the selective catalytic reduction device are supported by the beam member.

The hydraulic excavator according to a fourteenth embodiment of the present invention is related to the hydraulic excavator of the thirteenth embodiment, wherein the bottom portion of the selective catalytic reduction device is located lower than the beam member.

The hydraulic excavator according to a fifteenth embodiment of the present invention is related to the hydraulic excavator of the thirteenth embodiment, wherein the bellows part is located lower than the beam member.

The first connecting pipe in the hydraulic excavator according to the first embodiment of the present invention connects the engine and the diesel particulate filter device. Moreover, the diesel particulate filter device is located further away from the engine than the selective catalytic reduction device. As a result, the length of the first connecting pipe can be increased more than when the diesel particulate filter device is located closer to the engine than the selective catalytic reduction device. Moreover, by disposing the connecting portion of the first connecting pipe and the diesel particulate filter device below the diesel particulate filter device, the length of the first connecting pipe can be increased more than when the connecting portion is located at a side part on the engine side.

In this way, the length of the bellows part can be increased due to the increase in the length of the first connecting pipe. As a result, installation inaccuracies that occur when connecting the diesel particulate filter device and the engine can be absorbed even if the vehicle body frame deflects due to the weight of the diesel particulate filter device. Moreover, since the connecting portion is located below the diesel particulate filter device, interference with the first connecting pipe can be reduced even if the length of the first connecting pipe is increased since the diesel particulate filter device is removed upward. Consequently, complications that arise when connecting the engine and the diesel particulate filter device can be resolved.

Further, the connecting portion for the diesel particulate filter device and the first connecting pipe is located below the diesel particulate filter device. Moreover, the first connecting pipe passes below the selective catalytic reduction device. As a result, the first connecting pipe is less likely to cause interference with the diesel particulate filter device when lifting the diesel particulate filter device upward to remove the same from the vehicle. As a result, the diesel particulate filter device can be removed from the vehicle easily even if the length of the connecting pipe is increased. Therefore, difficulties when connecting the engine and the diesel particulate filter device are resolved and maintenance of the diesel particulate filter device can be improved in the hydraulic excavator according to the present embodiment.

In the hydraulic excavator according to the second embodiment of the present invention, the diesel particulate filter device can be easily removed from the vehicle by lifting the diesel particulate filter device upward.

In the hydraulic excavator according to the third embodiment of the present invention, the first connecting pipe is connected directly to the engine without roundabout since the second opening of the bend section faces toward the engine. As a result, twisting of the first connecting pipe and interference with surrounding equipment can be suppressed.

In the hydraulic excavator according to the fourth embodiment of the present invention, the diesel particulate filter device can be easily removed from the vehicle by lifting the diesel particulate filter device upward.

In the hydraulic excavator according to the fifth embodiment of the present invention, the bellows part can effectively absorb displacement of the diesel particulate filter device in the horizontal direction. As a result, a load on the first connecting pipe can be reduced even if the diesel particulate filter device shakes in the right-left direction due to column members of the vehicle body frame bending in the front-back direction or the right-left direction.

In the hydraulic excavator according to the sixth embodiment of the present invention, the diesel particulate filter device is disposed higher than the selective catalytic reduction device. As a result, the diesel particulate filter device can be lifted upward to be easily removed from the vehicle.

In the hydraulic excavator according to the seventh embodiment of the present invention, the diesel particulate filter device is disposed higher than the selective catalytic reduction device. As a result, the diesel particulate filter device can be lifted upward to be easily removed from the vehicle.

In the hydraulic excavator according to the eighth embodiment of the present invention, the second connecting pipe is located above the selective catalytic reduction device. Further, the diesel particulate filter device is disposed higher than the selective catalytic reduction device. As a result, the diesel particulate filter device, the selective catalytic reduction device, and the second connecting pipe can be disposed in a compact manner.

In the hydraulic excavator according to the ninth embodiment of the present invention, the first connecting pipe is connected to the diesel particulate filter device via the spherical joint. As a result, positioning of the first connecting pipe and the diesel particulate filter device is facilitated. Consequently, maintenance performance of the diesel particulate filter device can be improved.

In the hydraulic excavator according to the tenth embodiment of the present invention, the bellows part is disposed above the hydraulic pump. Therefore, a space between the diesel particulate filter device and the hydraulic pump can be used for disposing the bellows part.

In the hydraulic excavator according to the eleventh embodiment of the present invention, the exterior cover of the hydraulic excavator is attached to the vehicle body frame. Specifically, the vehicle body frame includes the functions of supporting the exterior cover and supporting the diesel particulate filter device and the selective catalytic reduction device.

In the hydraulic excavator according to the twelfth embodiment of the present invention, the bellows part extends in the vehicle width direction. As a result, the bellows part can effectively absorb displacement of the diesel particulate filter device in the vehicle width direction. As a result, a load on the first connecting pipe can be reduced even if the diesel particulate filter device shakes in the vehicle width direction due to the column members of the vehicle body frame bending in the vehicle width direction.

In the hydraulic excavator according to the thirteenth embodiment of the present invention, the diesel particulate filter device and the selective catalytic reduction device are supported by the beam member. Therefore, freedom in disposing the diesel particulate filter device and the selective catalytic reduction device in the horizontal direction is improved.

In the hydraulic excavator according to the fourteenth embodiment of the present invention, the bottom portion of the selective catalytic reduction device is located lower than the beam member. As a result, the diesel particulate filter device and the selective catalytic reduction device can be disposed in a lower location. Consequently, enlargement of the hydraulic excavator can be suppressed.

In the hydraulic excavator according to the fifteenth embodiment of the present invention, the bellows part is located lower than the beam member. As a result, the diesel particulate filter device and the selective catalytic reduction device can be disposed in a lower location. Consequently, enlargement of the hydraulic excavator can be suppressed.

DETAILED DESCRIPTION OF EMBODIMENTS

Figure 1:
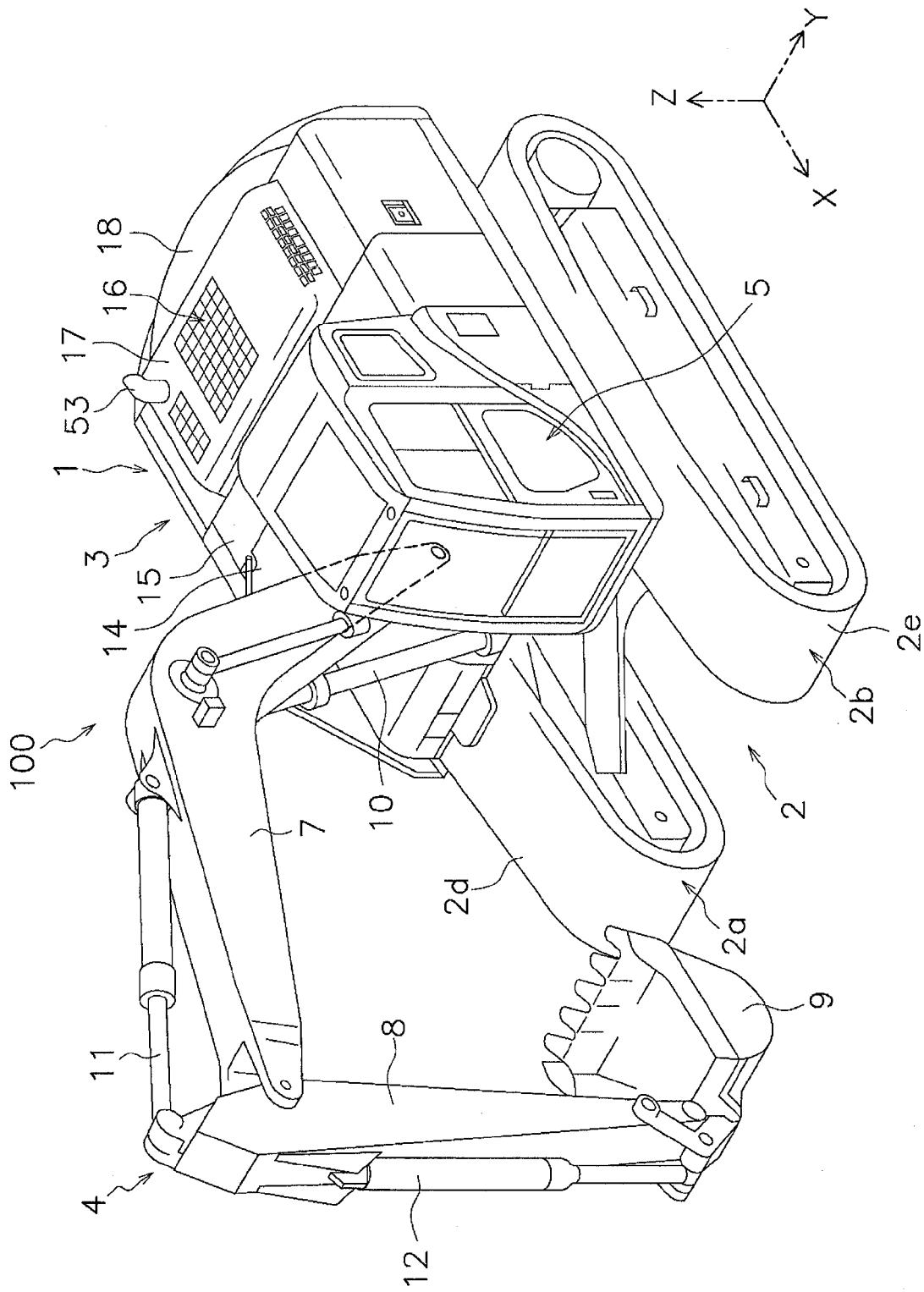
FIG. 1 is a perspective view of a hydraulic excavator according to a first embodiment of the present invention.

FIG. 1 illustrates a hydraulic excavator 100 according to the first embodiment of the present invention. The hydraulic excavator 100 is equipped with a vehicle body 1 and working implement 4.

The vehicle body 1 includes a traveling unit 2 and a revolving unit 3. The traveling unit 2 includes a pair of travel devices 2a and 2b. The travel devices 2a and 2b respectively include crawlers 2d and 2e. The travel devices 2a and 2b allow the hydraulic excavator 100 to travel due to the crawlers 2d and 2e being driven by driving power from a belowmentioned engine 21 (see FIG. 2).

The front-back direction in the following explanation signifies the front-back direction of the vehicle body 1. In other words, the front-back direction is the direction of the front and back as seen by an operator sitting in an operating cabin 5. The right-left direction or the lateral direction signifies the vehicle width direction of the vehicle body 1. In other words, the right-left direction, the vehicle width direction, and the lateral direction are directions to the left and right of the above operator. In the drawings, the front-back direction is depicted as the X axis, the right-left direction is depicted as the Y axis, and the vertical direction is depicted as the Z axis.

The revolving unit 3 is mounted on the traveling unit 2. The revolving unit 3 is provided in a rotatable manner with respect to the traveling unit 2. The operating cabin 5 is provided in the revolving unit 3. The revolving unit 3 includes a fuel tank 14, a hydraulic fluid tank 15, an engine room 16, and a counterweight 18. The fuel tank 14 accommodates fuel for driving the belowmentioned engine 21. The fuel tank 14 is disposed in front of the hydraulic fluid tank 15. The hydraulic fluid tank 15 accommodates hydraulic fluid discharged from a belowmentioned hydraulic pump 23 (see FIG. 2). The hydraulic fluid tank 15 is disposed in a line in the front-back direction with the fuel tank 14.

The engine room 16 houses equipment such as the engine 21 and the hydraulic pump 23 as described below. The engine room 16 is disposed rearward of the operating cabin 5, the fuel tank 14, and the hydraulic fluid tank 15. The top of the engine room 16 is covered by an engine hood 17. The counterweight 18 is disposed rearward of the engine room 16.

The working implement 4 is attached in a front center location of the revolving unit 3. The working implement 4 includes a boom 7, an arm 8, a bucket 9, a boom cylinder 10, an arm cylinder 11, and a bucket cylinder 12. The proximal end of the boom 7 is rotatably connected to the revolving unit 3. The distal end of the boom 7 is rotatably connected to the proximal end of the arm 8. The distal end of the arm 8 is rotatably connected to the bucket 9. The boom cylinder 10, the arm cylinder 11, and the bucket cylinder 12 are driven by hydraulic fluid discharged from the belowmentioned hydraulic pump 23. The boom cylinder 10 actuates the boom 7. The arm cylinder 11 actuates the arm 8. The bucket cylinder 12 actuates the bucket 9. The driving of the cylinders 10, 11, 12 drives the working implement 4.

Figure 2:
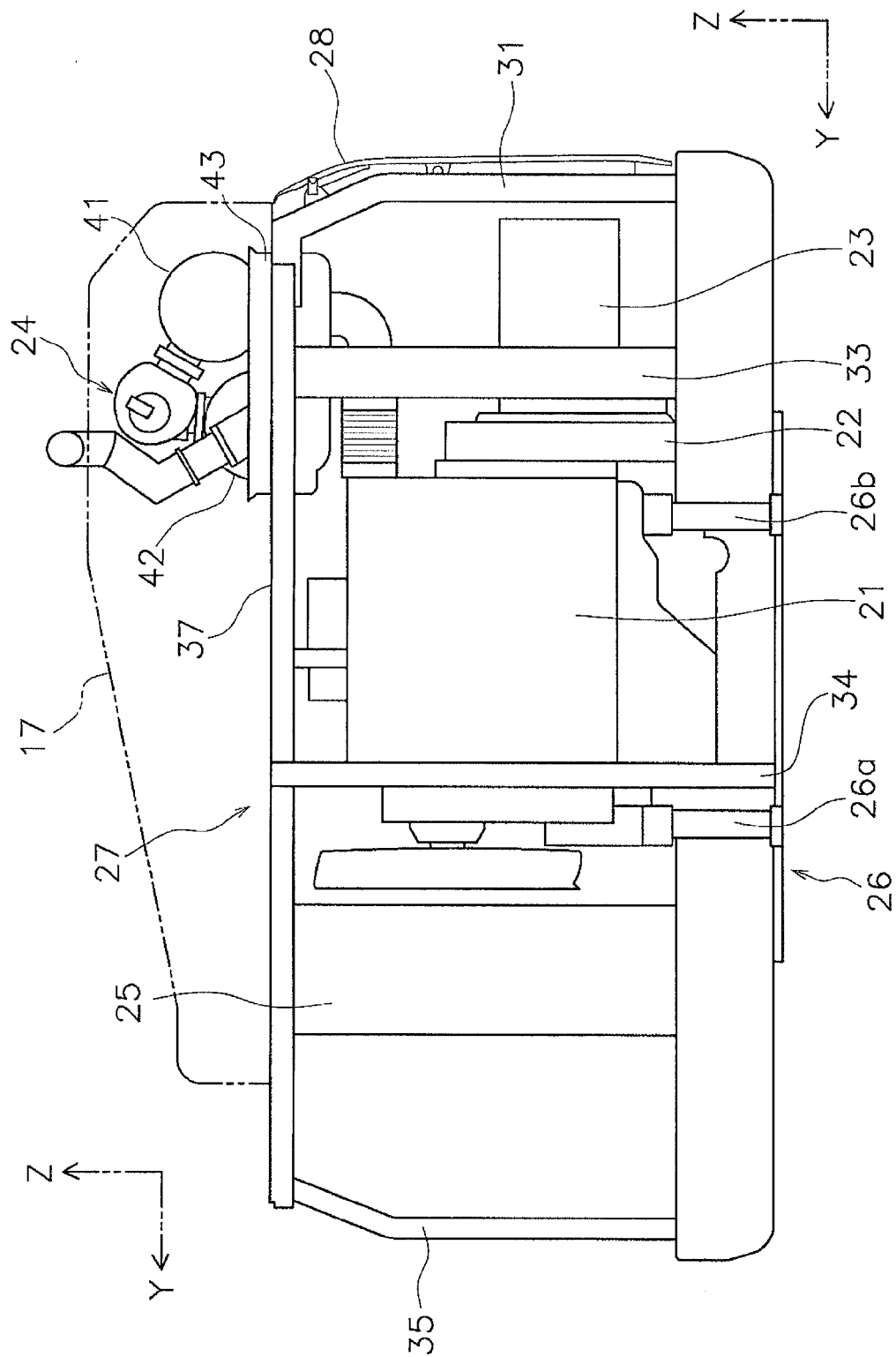
FIG. 2 illustrates an internal structure of an engine room of the hydraulic excavator as seen from the rear.
Figure 3:
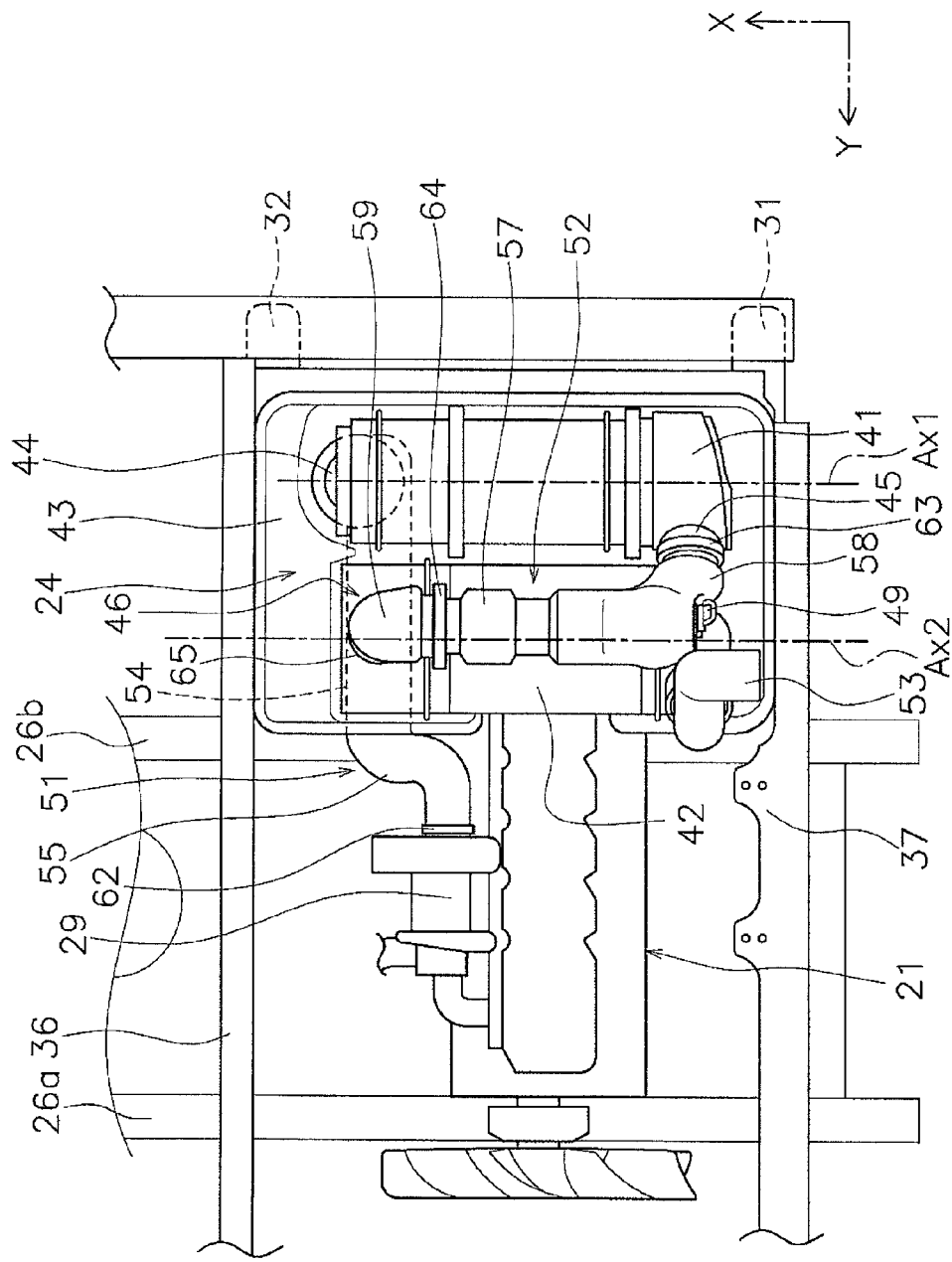
FIG. 3 is a top view the internal structure of the engine room.

FIG. 2 illustrates the internal structure of the engine room 16 as seen from the rear. FIG. 3 is a top view the internal structure of the engine room 16. As illustrated in FIG. 2, the engine 21, a flywheel housing 22, the hydraulic pump 23, and an exhaust processing unit 24 are disposed in the engine room 16. A cooling device 25 including a radiator and an oil cooler is disposed in the engine room 16. The cooling device 25, the engine 21, the flywheel housing 22, and the hydraulic pump 23 are disposed in a row in the vehicle width direction.

As illustrated in FIG. 2, the hydraulic excavator 100 includes the revolving frame 26 and the vehicle body frame 27. The revolving frame 26 includes a pair of center frames 26a and 26b that extend in the front-back direction. The revolving frame 26 supports the engine 21 through a rubber damper.

The vehicle body frame 27 is provided on the revolving frame 26 in a standing manner. The vehicle body frame 27 is disposed around equipment such as the engine 21 and the hydraulic pump 23 and the like. An exterior cover 28 is attached to the vehicle body frame 27. Only a portion of the exterior cover 28 is shown in FIG. 2. The engine hood 17 illustrated in FIG. 1 is also attached to the vehicle body frame 27.

As illustrated in FIGS. 2 and 3, the vehicle body frame 27 includes a plurality of column members 31 to 35 and a plurality of beam members 36 and 37. The column members 31 to 35 are disposed to extend upwards from the revolving frame 26. The beam members 36 and 37 are supported by the column members 31 to 35. Specifically, as illustrated in FIG. 3, the plurality of beam members 36 and 37 include a first beam member 36 and a second beam member 37. The first beam member 36 and the second beam member 37 are disposed away from each other in the front-back direction. The first beam member 36 is disposed forward of the engine 21. The second beam member 36 is disposed rearward of the engine 21.

The hydraulic pump 23 is driven by the engine 21. As illustrated in FIG. 2, the hydraulic pump 23 is disposed lateral side of the engine 21. Specifically, the hydraulic pump 23 is disposed in a row with the engine 21 in the vehicle width direction. The hydraulic pump 23 is disposed in a location lower than an upper surface of the engine 21.

The flywheel housing 22 is disposed between the engine 21 and the hydraulic pump 23. The flywheel housing 22 is attached to a side surface of the engine 21. The hydraulic pump 23 is attached to a side surface of the flywheel housing 22.

The exhaust processing unit 24 includes a diesel particulate filter device 41, a selective catalytic reduction device 42, and a bracket 43. The exhaust processing unit 24 is disposed above the hydraulic pump 23. The exhaust processing unit 24 is disposed so as to cross between the first beam member 36 and the second beam member 37. The exhaust processing unit 24 is supported by the beam members 36 and 37. That is, the diesel particulate filter device 41 and the selective catalytic reduction device 42 are supported by the vehicle body frame 27.

The diesel particulate filter device 41 is a device for processing exhaust from the engine 21. The diesel particulate filter device 41 collects particulate matter included in the exhaust with a filter. The diesel particulate filter device 41 burns the collected particulate matter with a heater provided with the filter.

The diesel particulate filter device 41 has a roughly tubular shape. As illustrated in FIG. 3, a central axis Ax1 of the diesel particulate filter device 41 is disposed along the front-back direction. Therefore, the central axis Ax1 of the diesel particulate filter device 41 is disposed to be orthogonal to the direction in which the engine 21 and the hydraulic pump 23 are disposed (referred to as "first direction" below). In other words, the longitudinal direction of the diesel particulate filter device 41 is disposed in a state of being orthogonal to the first direction. The central axis Ax1 of the diesel particulate filter device 41 is disposed to be parallel to a central axis Ax2 of the selective catalytic reduction device 42.

The diesel particulate filter device 41 is located further away from the engine 12 than the selective catalytic reduction device in a first direction on a horizontal plane. Specifically, projections of each of the engine 21, the selective catalytic reduction device 42, and the diesel particulate filter device 41 in the horizontal plane are disposed to form a row in the first direction in the order of the engine 21, the selective catalytic reduction device 42, and the diesel particulate filter device 41. The first direction is the vehicle width direction in the present embodiment. Specifically, as illustrated in FIG. 3, the diesel particulate filter device 41 and the selective catalytic reduction device 42 are disposed in a row in order along the first direction which is the vehicle width direction. Therefore, the diesel particulate filter device 41 is located further away from the engine 21 than the selective catalytic reduction device 42.

Figure 4:
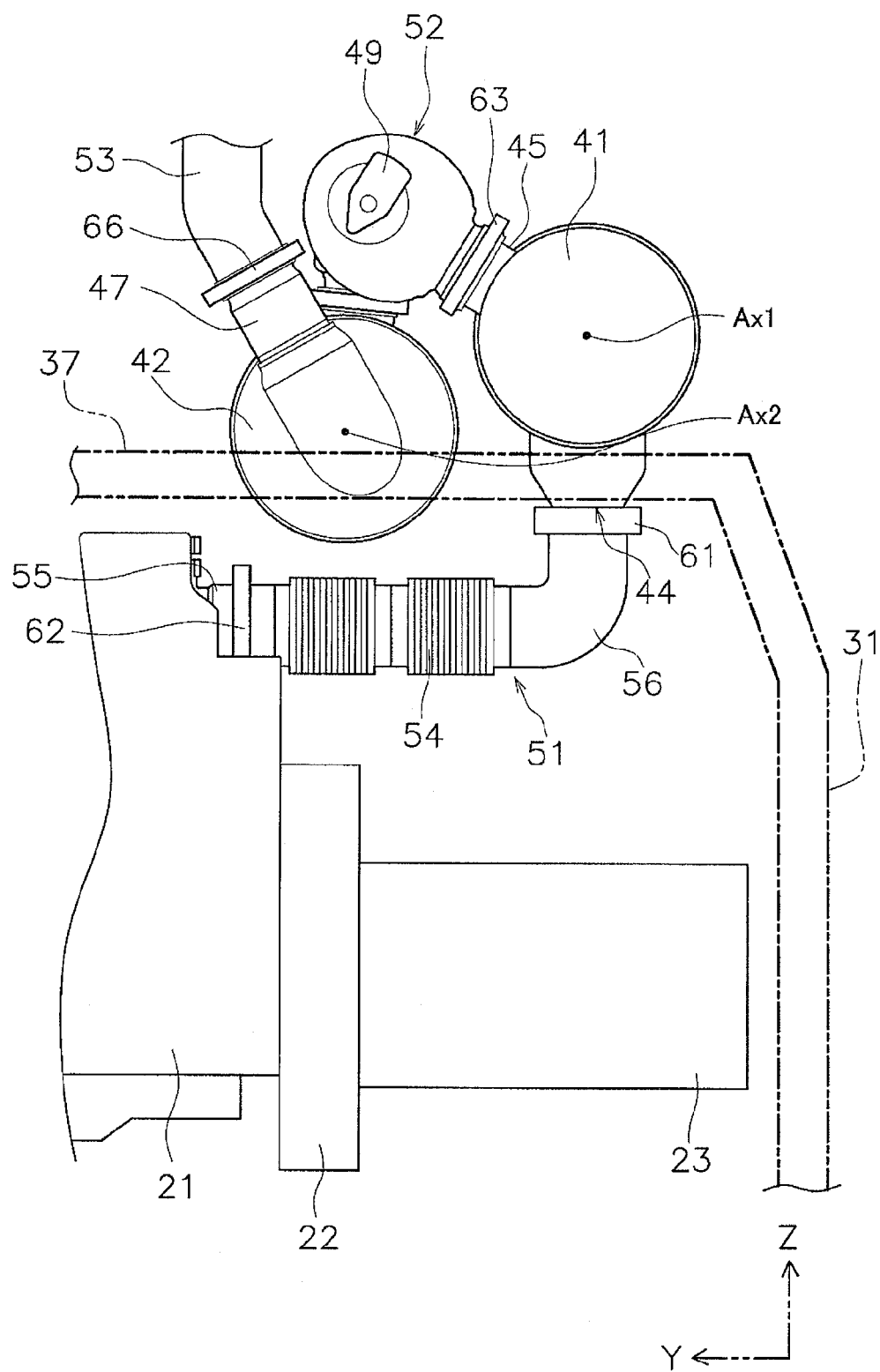
FIG. 4 illustrates a diesel particulate filter device and a selective catalytic reduction device as seen from the rear.

FIG. 4 illustrates the diesel particulate filter device 41 and the selective catalytic reduction device 42 as seen from the rear. Portions of the structure such as the bracket 43 are omitted in FIG. 4 to facilitate understanding. As illustrated in FIG. 4, the diesel particulate filter device 41 and the selective catalytic reduction device 42 are disposed near each other and the longitudinal directions thereof are disposed in a row orthogonal to the vehicle width direction.

The top portion of the diesel particulate filter device 41 is located higher than the top portion of the selective catalytic reduction device 42. The bottom portion of the diesel particulate filter device 41 is located higher than the bottom portion of the selective catalytic reduction device 42. The bottom portion of the diesel particulate filter device 41 is located lower than the top portion of the selective catalytic reduction device 42. The diesel particulate filter device 41 is disposed above the hydraulic pump 23. The diesel particulate filter device 41 is disposed higher than the beam members 36 and 37.

The selective catalytic reduction device 42 is a device for processing exhaust from the engine 21. The selective catalytic reduction device 42 conducts hydrolysis of urea and selectively reduces nitrogen oxides NOx. The selective catalytic reduction device 42 has a roughly tubular shape. The central axis Ax2 of the selective catalytic reduction device 42 is disposed along the front-back direction. Therefore, the central axis Ax1 of the diesel particulate filter device 41 is disposed to be orthogonal to the first direction. In other words, the longitudinal direction of the diesel particulate filter device 41 is disposed in a state of being orthogonal to the first direction.

The selective catalytic reduction device 42 is disposed higher than the hydraulic pump 23. The bottom portion of the selective catalytic reduction device 42 is located lower than the upper surface of the engine 21. The bottom portion of the selective catalytic reduction device 42 is located lower than the beam members 36 and 37. The top portion of the selective catalytic reduction device 42 is located higher than the beam members 36 and 37.

The diesel particulate filter device 41 includes a first connection 44. As illustrated in FIG. 4, the hydraulic excavator 100 includes a first connecting pipe 51. As illustrated in FIG. 3, one end of the first connecting pipe 51 is connected to an exhaust port of the engine 21 through a supercharger 29. As illustrated in FIG. 4, another end of the first connecting pipe 51 is connected to the first connection 44 of the diesel particulate filter device 41. Specifically, the first connecting pipe 51 connects the engine 21 and the diesel particulate filter device 41.

The first connection 44 is located in the bottom portion of the diesel particulate filter device 41. Therefore, the connecting portion for the diesel particulate filter device 41 and the first connecting pipe 51 is located below the diesel particulate filter device 41. Therefore, FIG. 4 illustrates a state in which the connecting portion is located straight below the diesel particulate filter device 41 as an example of a state in which the connecting portion for the diesel particulate filter device 41 and the first connecting pipe 51 is located below the diesel particulate filter device 41. In other words, the connecting portion for the diesel particulate filter device 41 and the first connecting pipe 51 is located below the center of the circular cross-section of the diesel particulate filter device 41. Specifically, the first connecting pipe 51 is connected to the diesel particulate filter device 41 through a spherical joint 61. A known technique disclosed in, for example, US 2011/0074150A1 may be used as the spherical joint 61.

As illustrated in FIG. 4, the first connecting pipe 51 includes an extendable bellows part 54. For example, the bellows part 54 is formed by coupling a plurality of bellow-shaped expansion joints. The bellows part 54 is disposed horizontally. Specifically, the bellows part 54 extends in the vehicle width direction. The bellows part 54 is disposed above the hydraulic pump 23. The bellows part 54 is located lower than the beam members 36 and 37. A portion of the bellows part 54 is located below the selective catalytic reduction device 42. That is, the first connecting pipe 51 passes below the selective catalytic reduction device 42 to be connected to the diesel particulate filter device 41. When the bellows part 54 is configured with the plurality of bellows expansion joints, the length of the bellows part 54 is the accumulative length of the bellows expansion joints.

The length of the first connecting pipe 51 in the vehicle width direction is longer than the distance between the center of the diesel particulate filter device 41 and the center of the selective catalytic reduction device 42. In other words, the length of the first connecting pipe 51 in the vehicle width direction is longer than the distance in the vehicle width direction between the central axis Ax1 of the diesel particulate filter device 41 and the central axis Ax1 of the selective catalytic reduction device 42.

The length (path length) of the bellows part 54 is greater than the dimension of the diesel particulate filter device 41 in the vehicle width direction. Specifically, the length of the bellows part 54 is greater than the diameter of the diesel particulate filter device 41. The length of the bellows part 54 is greater than the dimension of the selective catalytic reduction device 42 in the vehicle width direction. Specifically, the length of the bellows part 54 is greater than the diameter of the selective catalytic reduction device 42.

The first connecting pipe 51 includes a first bend section 55 and a second bend section 56. As illustrated in FIG. 3, the first bend section 55 connects the bellows part 54 and the engine 21. As illustrated in FIG. 4, the first bend section 55 is connected to the bellows part 54 through a spherical joint 62. The second bend section 56 connects the bellows part 54 and the first connection 44. The second bend section 56 is connected to the first connection 44 through the spherical joint 61.

As illustrated in FIGS. 3 and 4, the diesel particulate filter device 41 includes a second connection 45. The second connection 45 is located further toward the selective catalytic reduction device 42 than the central axis Ax1 of the diesel particulate filter device 41. The second connection 45 is located higher than the central axis Ax1 of the diesel particulate filter device 41. The second connection 45 projects obliquely in the vehicle width direction and upward. The selective catalytic reduction device 42 includes a third connection 46. As illustrated in FIG. 3, third connection 46 is located at the top portion of the selective catalytic reduction device 42.

As illustrated in FIGS. 3 and 4, the exhaust processing unit 24 includes a second connecting pipe 52. One end of the second connecting pipe 52 is connected to the second connection 45 of the diesel particulate filter device 41. The other end of the second connecting pipe 52 is connected to the third connection 46 of the selective catalytic reduction device 42. Specifically, the second connecting pipe 52 connects the diesel particulate filter device 41 and the selective catalytic reduction device 42. The second connecting pipe 52 is located above the selective catalytic reduction device 42.

As illustrated in FIG. 3, the second connecting pipe 52 includes a linear section 57. The linear section 57 is located above the selective catalytic reduction device 42. The linear section 57 extends in a direction parallel to the central axis Ax1 of the selective catalytic reduction device 42. The second connecting pipe 52 includes a third bend section 58 and a fourth bend section 59. The third bend section 58 connects the linear section 57 and the second connection 45. The third bend section 58 is connected to the second connection 45 through a spherical joint 63. The third bend section 58 is attached to a urea water injection device 49. The urea water injection device 49 injects urea into the second connecting pipe 52.

The fourth bend section 59 connects the linear section 57 and the third connection 46. The fourth bend section 59 is connected to the linear section 57 through a spherical joint 64. The fourth bend section 59 is connected to the third connection 46 through a spherical joint 65.

As illustrated in FIG. 4, the selective catalytic reduction device 42 includes a fourth connection 47. The fourth connection 47 projects obliquely upward. Specifically, the fourth connection 47 projects obliquely upward and toward the engine 21. The abovementioned urea water injection device 49 is located above the fourth connection 47 and the fourth connection 47 is disposed obliquely to avoid interfering with the urea water injection device 49. The hydraulic excavator 100 includes a third connecting pipe 53. The third connecting pipe 53 is connected to the fourth connection 47. Specifically, the third connecting pipe 53 is connected to the fourth connection 47 through a spherical joint 66. The upper portion of the third connecting pipe 53 projects upward from the engine hood 17.

The engine 21, the first connecting pipe 51, the diesel particulate filter device 41, the second connecting pipe 52, the selective catalytic reduction device 42, and the third connecting pipe 53 are connected serially in order. Therefore, the exhaust from the engine 21 passes through the first connecting pipe 51 and is fed to the diesel particulate filter device 41. The diesel particulate filter device 41 mainly reduces particulate matter in the exhaust. Next, the exhaust passes through the second connecting pipe 52 and is fed to the selective catalytic reduction device 42. NOx is mainly reduced in the selective catalytic reduction device 42. Next, the purified exhaust passes through the third connecting pipe 53 and is exhausted externally.

The bracket 43 connects the diesel particulate filter device 41 and the selective catalytic reduction device 42. As a result, the diesel particulate filter device 41, the selective catalytic reduction device 42, and the bracket 43 are formed in an integrated manner. The bracket 43 is fixed to the vehicle body frame 27. Consequently, the exhaust processing unit 24 is fixed to the vehicle body frame 27. The bracket 43 is attached to the vehicle body frame 27 in a detachable manner by a fixing means such as bolts. Therefore, the exhaust processing unit can be removed from the vehicle by removing the bracket 43 from the vehicle body frame 27.

The diesel particulate filter device 41 can be removed from the vehicle by removing the diesel particulate filter device 41 from the bracket 43. In this case, the first connecting pipe 51 is removed from the first connection 44. The second connecting pipe 52 is removed from the second connection 45. The diesel particulate filter device 41 then is removed from the bracket 43. The diesel particulate filter device 41 is lifted upward by hoisting with a crane and the like. As a result, the diesel particulate filter device 41 can be removed from the vehicle.

The hydraulic excavator 100 according to the present embodiment has the following features.

Since the first connecting pipe 51 has the bellows-like bellows part 54, the connection of the engine 21 and the diesel particulate filter device 41 is facilitated.

The first connecting pipe 51 passes below the selective catalytic reduction device 42 to be connected to the diesel particulate filter device 41. Further, the connecting portion for the diesel particulate filter device 41 and the first connecting pipe 51 is located below the diesel particulate filter device 41. As a result, the diesel particulate filter device 41 can be lifted upward to be easily removed from the vehicle without interference from the first connecting pipe 51.

The diesel particulate filter device 41 and the selective catalytic reduction device 42 are supported by a vehicle body frame 27. The diesel particulate filter device 41 and the selective catalytic reduction device 42 can be supported without the use of a new member by using the previously provided vehicle body frame 27 to support the diesel particulate filter device 41 and the selective catalytic reduction device 42. Consequently, material costs can be reduced.

The first connecting pipe 51 includes the bellows part 54. The bellows part 54 can effectively absorb displacement of the diesel particulate filter device 41. As a result, a load on the first connecting pipe 51 can be reduced even if the diesel particulate filter device 41 shakes in the horizontal direction due to the column members 31 to 35 of the vehicle body frame 27 bending in the horizontal direction. The bellows part 54 is disposed so as to extend in the vehicle width direction. As a result, the bellows part can effectively absorb displacement of the diesel particulate filter device 41 in the vehicle width direction. The bellows part 54 can also effectively absorb vertical vibration of the diesel particulate filter device 41.

The diesel particulate filter device 41 is located further away from the engine 21 than the selective catalytic reduction device 42. As a result, the length of the first connecting pipe 51 can be made longer. Therefore, the length of the bellows part 54 can be made longer. Consequently, the load on the first connecting pipe 51 due to vibration can be further reduced.

The diesel particulate filter device 41 is located higher than the selective catalytic reduction device 42. As a result, the diesel particulate filter device 41 can be lifted upward to be easily removed from the vehicle.

The second connecting pipe 52 is located above the selective catalytic reduction device 42. As a result, the diesel particulate filter device 41, the selective catalytic reduction device 42, and the second connecting pipe 52 can be disposed in a compact manner.

The first connecting pipe 51 is connected to the diesel particulate filter device 41 through the spherical joint 61. Therefore, positioning of the first connecting pipe 51 and the diesel particulate filter device 41 is facilitated. Consequently, maintenance performance of the diesel particulate filter device 41 can be improved.

The bellows part 54 is disposed above the hydraulic pump 23. Therefore, a space between the diesel particulate filter device 41 and the hydraulic pump 23 can be used for disposing the bellows part 54.

The exterior cover 28 is attached to the vehicle body frame 27. Specifically, the vehicle body frame 27 includes the functions of supporting the exterior cover 28 and supporting the diesel particulate filter device 41 and the selective catalytic reduction device 42.

The diesel particulate filter device 41 and the selective catalytic reduction device 42 are supported by the beam members 36 and 37. Therefore, freedom in disposing the diesel particulate filter device 41 and the selective catalytic reduction device 42 in the horizontal direction is improved.

The bottom portion of the selective catalytic reduction device 42 is located lower than the beam members 36 and 37. As a result, the exhaust processing unit 24 can be disposed in a low location. Consequently, enlargement of the hydraulic excavator 100 can be suppressed.

The bellows part 54 is located lower than the beam members 36 and 37. As a result, the exhaust processing unit 24 can be disposed in a low location. Consequently, enlargement of the hydraulic excavator 100 can be suppressed.

Although an embodiment of the present invention has been described so far, the present invention is not limited to the above embodiments and various modifications may be made within the scope of the invention.

The diesel particulate filter device 41 may be disposed lower than the selective catalytic reduction device 42. The selective catalytic reduction device 42 may be disposed higher than the beam members 36 and 37.

The diesel particulate filter device 41 is not limited to a tubular shape and may have an oval shape, a rectangular shape, or another shape. The selective catalytic reduction device is not limited to a tubular shape and may have an oval shape, a rectangular shape, or another shape.

The diesel particulate filter device 41 and the selective catalytic reduction device 42 may be disposed in a row in a direction different from the vehicle width direction. For example, the diesel particulate filter device 41 and the selective catalytic reduction device 42 may be disposed in the front-back direction of the vehicle.

The diesel particulate filter device 41 may be supported by any of the column members 31 to 35. The selective catalytic reduction device 42 may be supported by any of the column members 31 to 35. The vehicle body frame 27 that supports the diesel particulate filter device 41 and the selective catalytic reduction device 42 is not limited to supporting the exterior cover 28. For example, a dedicated vehicle body frame for supporting the diesel particulate filter device 41 and the selective catalytic reduction device 42 may be provided.

The first connecting pipe 51 may be connected to the diesel particulate filter device 41 without a spherical joint. Some or all of the spherical joints connected to the second connecting pipe 52 and the third connecting pipe 53 may be omitted. However, spherical joints are preferably provided to facilitate positioning of the connecting pipes.

The bellows part 54 may be provided for the entire first connecting pipe 51 instead of a portion of the first connecting pipe 51. The length of the bellows part 54 may be longer than the length described above. Alternatively, the length of the bellows part 54 may be shorter than the length described above. However, the length of the bellows part 54 is preferably longer to improve the vibration absorption capability. The connecting portion for the diesel particulate filter device and the first connecting pipe may be located offset from being straight below the diesel particulate filter device. For example, the connecting portion for the diesel particulate filter device and the first connecting pipe may be located offset from a location below the center of circular cross-section of the diesel particulate filter device if the diesel particulate filter device has a tubular shape.

According to the present invention, a hydraulic excavator is provided in which difficulties when connecting the engine and the diesel particulate filter device are resolved, and in which maintenance performance of the diesel particulate filter device can be improved.

what is claimed is:

1. A hydraulic excavator comprising:
    an engine;
    a revolving frame supporting the engine;
    a vehicle body frame disposed on the revolving frame, the vehicle body frame including a plurality of column members;
    a diesel particulate filter device configured to process exhaust from the engine, the diesel particulate filter device being supported by the vehicle body frame;
    a selective catalytic reduction device configured to process exhaust from the engine, the selective catalytic reduction device being supported by the vehicle body frame; and
    a first connecting pipe having an extendable bellows part in at least a portion thereof, the first connecting pipe connecting the engine and the diesel particulate filter device,
    the diesel particulate filter device being located further away from the engine than the selective catalytic reduction device, the first connecting pipe passing below the selective catalytic reduction device and being connected to the diesel particulate filter device, a top portion of the diesel particulate filter device being disposed above a top portion of the selective catalytic reduction device, and the diesel particulate filter device not overlapping the engine in a plan view, a connecting portion for the first connecting pipe and the diesel particulate filter device being disposed at a bottom portion of the diesel particulate filter device.

2. The hydraulic excavator according to claim 1, wherein the first connecting pipe has a bend section;

the bend section includes a first opening provided at a first end of the bend section and connected to the connecting portion, and a second opening provided at a second end of the bend section and connected to the bellows part; and the second opening faces toward the engine.

3. The hydraulic excavator according to claim 1, wherein the diesel particulate filter device has a tubular shape; and the connecting portion is located below a center of a circular cross-section of the diesel particulate filter device.

4. The hydraulic excavator according to claim 1, wherein the bellows part is disposed horizontally.

5. The hydraulic excavator according to claim 1, further comprising:

a second connecting pipe connecting the diesel particulate filter device and the selective catalytic reduction device, the second connecting pipe being located above the selective catalytic reduction device.

6. The hydraulic excavator according to claim 1, wherein the first connecting pipe is connected to the diesel particulate filter device via a spherical joint.

7. The hydraulic excavator according to claim 1, further comprising:

a hydraulic pump driven by the engine, the bellows part being disposed above the hydraulic pump.

8. The hydraulic excavator according to claim 1, further comprising:

an external cover attached to the vehicle body frame.

9. The hydraulic excavator according to claim 1, wherein the diesel particulate filter device and the selective catalytic reduction device are arranged in a row along a vehicle width direction and in a state in which respective longitudinal directions thereof are orthogonal to the vehicle width direction; and the bellows part extends in the vehicle width direction.

10. The hydraulic excavator according to claim 1, wherein the vehicle body frame includes a beam member supported by the column members; and the diesel particulate filter device and the selective catalytic reduction device are supported by the beam member.

11. The hydraulic excavator according to claim 10, wherein a bottom portion of the selective catalytic reduction device is located lower than the beam member.

12. The hydraulic excavator according to claim 10, wherein the bellows part is located lower than the beam member.

13. The hydraulic excavator according to claim 1, wherein a connecting portion for the diesel particulate filter device and the first connecting pipe is located directly below the diesel particulate filter device.

14. The hydraulic excavator according to claim 1, wherein the first connecting pipe includes a bend section, the first connecting pipe extends perpendicularly downward from the bottom portion of the diesel particulate filter device to the bend section, the bend section bends the first connecting pipe toward the engine.

15. A hydraulic excavator comprising:

an engine;

a rotating frame supporting the engine;

a vehicle body frame disposed on the rotating frame, the vehicle body frame including a plurality of column members;

a diesel particulate filter device configured to process exhaust from the engine, the diesel particulate filter device being supported by the vehicle body frame;

a selective catalytic reduction device configured to process exhaust from the engine, the selective catalytic reduction device being supported by the vehicle body frame;

a first connecting pipe having an extendable bellows part in at least a portion thereof, the first connecting pipe connecting the engine and the diesel particulate filter device;

the diesel particulate filter device being located further away from the engine than the selective catalytic reduction device;

the first connecting pipe passing below the selective catalytic reduction device and being connected to the diesel particulate filter device;

a bottom portion of the diesel particulate filter device being disposed higher than a bottom portion of the selective catalytic reduction device; and the diesel particulate filter device not overlapping the engine in a plan view, a connecting portion for the first connecting pipe and the diesel particulate filter device being disposed at a bottom portion of the diesel particulate filter device.

16. The hydraulic excavator according to claim 15, wherein the first connecting pipe has a bend section;

the bend section includes a first opening provided at a first end of the bend section and connected to the connecting portion, and a second opening provided at a second end of the bend section and connected to the bellows part; and the second opening faces toward the engine.

17. The hydraulic excavator according to claim 15, wherein the diesel particulate filter device and the selective catalytic reduction device are arranged in a row along a vehicle width direction and in a state in which respective longitudinal directions thereof are orthogonal to the vehicle width direction; and the bellows part extends in the vehicle width direction.

18. The hydraulic excavator according to claim 15, wherein the vehicle body frame includes a beam member supported by the column members; and the diesel particulate filter device and the selective catalytic reduction device are supported by the beam member.

19. The hydraulic excavator according to claim 18, wherein a bottom portion of the selective catalytic reduction device is disposed lower than the beam member.

20. The hydraulic excavator according to claim 15, wherein the first connecting pipe includes a bend section, the first connecting pipe extends perpendicularly downward from the bottom portion of the diesel particulate filter device to the bend section, the bend section bends the first connecting pipe toward the engine.

* * * * *